Figure 1:
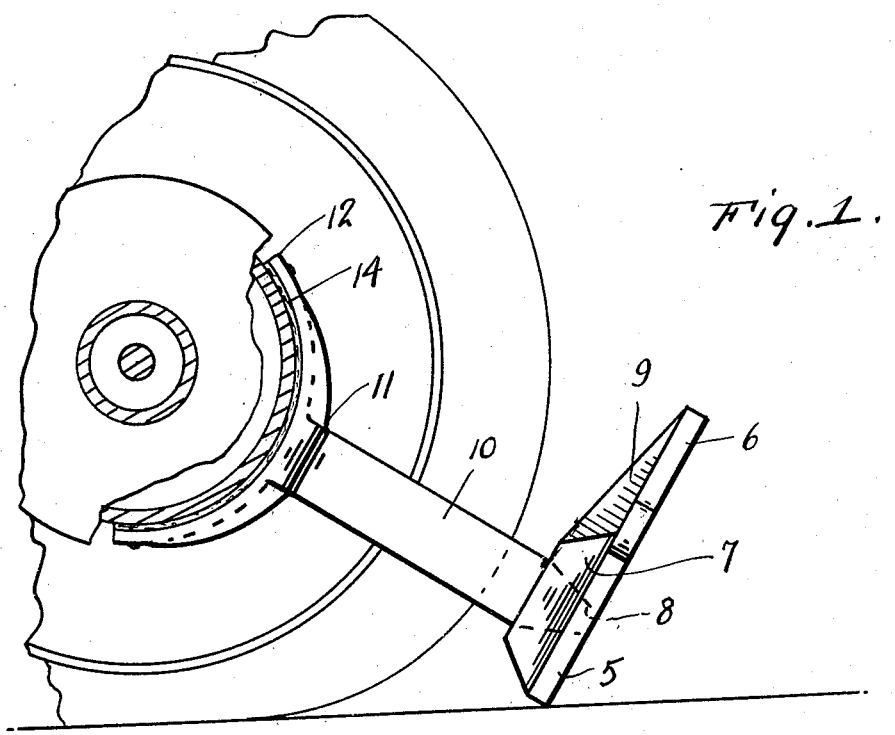

July 12, 1932.    J. W. BRIGHT    1,867,055
AUTOMOBILE LIFT
Filed Aug. 22, 1930    2 Sheets-Sheet 1

Inventor
John W. Bright
By Clarence A. O'Brien
Attorney

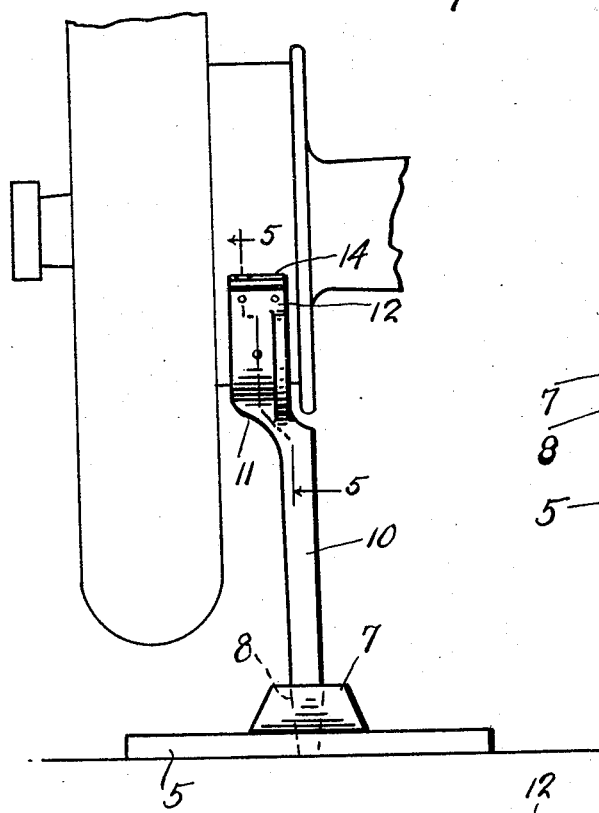
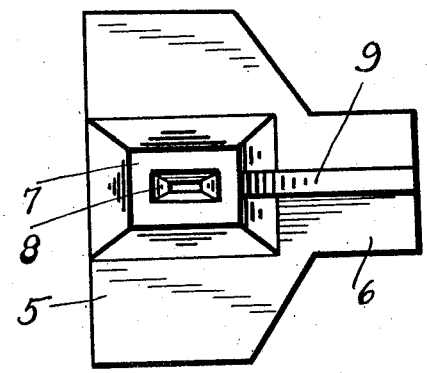
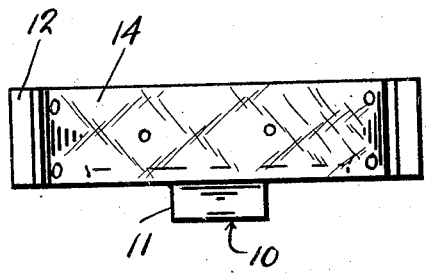
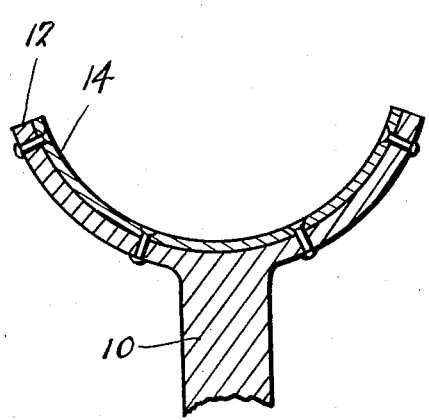

Patented July 12, 1932

1,867,055

UNITED STATES PATENT OFFICE

JOHN W. BRIGHT, OF GRAND JUNCTION, COLORADO, ASSIGNOR TO P. D. Q. AUTO JACK MFG. CO., A CORPORATION OF COLORADO

AUTOMOBILE LIFT

Application filed August 22, 1930. Serial No. 477,096.

The present invention relates to a lift for motor vehicles and the like, the general object of the invention being to provide a simple device which can be placed under the brake drum of a wheel while in a tilted position and then the vehicle rocked to cause the device to assume an upright position and thereby lift the wheel off the ground.

A further important object of the invention resides in the provision of an automobile lift of this nature which is exceedingly simple in its construction, inexpensive to manufacture, thoroughly efficient and reliable in use, easy to manipulate and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
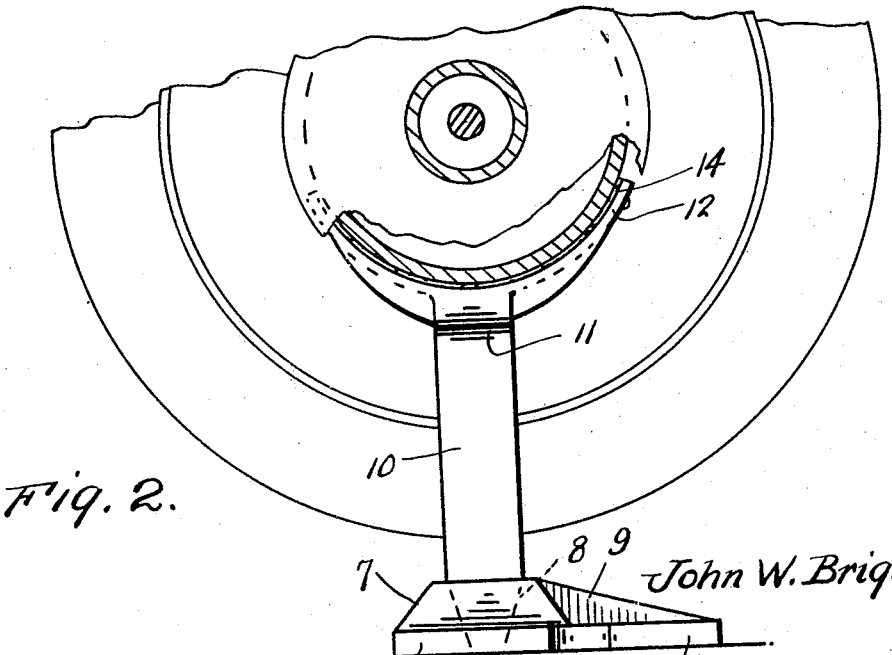

In the drawings:

Figure 1 is an elevation of the device in a tilted position applied to the brake drum of an automobile wheel, Figure 2 is a similar view with a device in an upright position, Figure 3 is a view taken at right angles to that shown in Figure 2, Figure 4 is a top plan view of the base, Figure 5 is a sectional view through the head, and Figure 6 is a top plan view of the device with the base removed.

Referring to the drawings in detail it will be seen that the numeral 5 denotes a base plate having an extension 6 smaller in width. On the central portion of the base plate 5 there is an enlargement 7 rising therefrom having its downwardly tapering pocket 8 formed therein. A brace rib 9 extends from the enlargement along the extension 6. The numeral 10 denotes a shank, the bottom end of which is pointed to be received in the pocket 8. The upper end is offset as at 11 and has an arcuate head 12 formed thereon lined with suitable material as indicated at 14.

The pointed end of the shank 10 is wedged into the pocket 8 and then the device is disposed in a tilted position as shown in Figure 1 with the head circumjacent the brake drum of the wheel. The vehicle is then moved so that the device takes an upright position as shown in Figure 2 with the wheel raised from the ground.

It is though that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An automobile lift of the class described comprising a base, a shank rising from the base, an arcuate head on the upper end of the shank for engaging the brake drum of a wheel, a lining in said head, said upper end of the shank being offset to one side, said base having an enlargement with a pocket therein to detachably receive the lower end of the shank, said lower end of the shank being pointed and said pocket being tapered so as to receive said pointed end, said base having an extension, and a brace rib along the extension.

2. An automobile lift of the class described, in combination with a motor wheel provided with internal expanding type of brake drum, an arcuate head adapted to fit under the lower portion of said brake drum and engage the same against rotation, a shank extending downwardly from the said head, the upper end of said shank being offset to one side and the lower end thereof being pointed, and a base having an enlargement provided with a tapered pocket therein adapted to detachably receive the lower end of said shank, said base having an extension disposed in front of said enlargement.

3. An automobile lift of the class described, in combination with a motor wheel provided with internal expanding type of brake drum, a base, said base having an enlargement provided with a tapered pocket therein and an extension disposed in front of said enlargement adapted to hold said base securely in position on the roadbed, a shank rising from said base, the lower end of said shank being pointed and adapted to fit into said pocket and the upper end thereof being offset to one side, an arcuate head attached to said offset and adapted to fit under the lower portion of the said brake drum, a lining in said head adapted to engage and hold said brake drum tight against rotation, thereby causing the wheel to be raised with a slight movement of the automobile.

In testimony whereof I affix my signature.

JOHN W. BRIGHT.